C. A. MORRISON.
ELASTIC NON-INFLATABLE TIRE.
APPLICATION FILED JUNE 4, 1919.

1,316,501.

Patented Sept. 16, 1919.

Inventor:
C. A. Morrison
by E. W. Anderson
Attorneys

UNITED STATES PATENT OFFICE.

CARY A. MORRISON, OF DELAWARE, OHIO.

ELASTIC NON-INFLATABLE TIRE.

1,316,501.  Specification of Letters Patent.  Patented Sept. 16, 1919.

Application filed June 4, 1919. Serial No. 301,646.

*To all whom it may concern:*

Be it known that I, CARY ARTHUR MORRISON, a citizen of the United States, resident of Delaware, in the county of Delaware and State of Ohio, have made a certain new and useful Invention in Elastic Non-Inflatable Tires; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to rubber tires, designed mainly for the wheels of motor vehicles, and of the non-inflatable elastic type, having for its object to provide a tire of elasticity increased to a point nearly approximating that of a pneumatic tire and wherein improved means are provided to brace against collapse. Other objects and advantages will hereinafter appear.

The invention consists in the novel construction and combinations of parts as hereinafter set forth.

Figure 1:
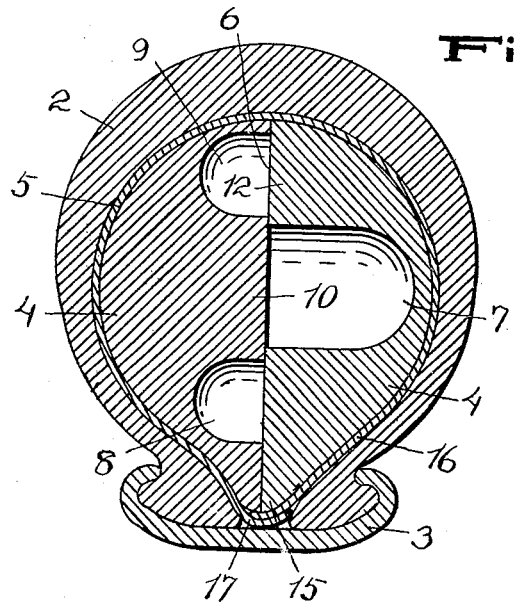
Figure 2:
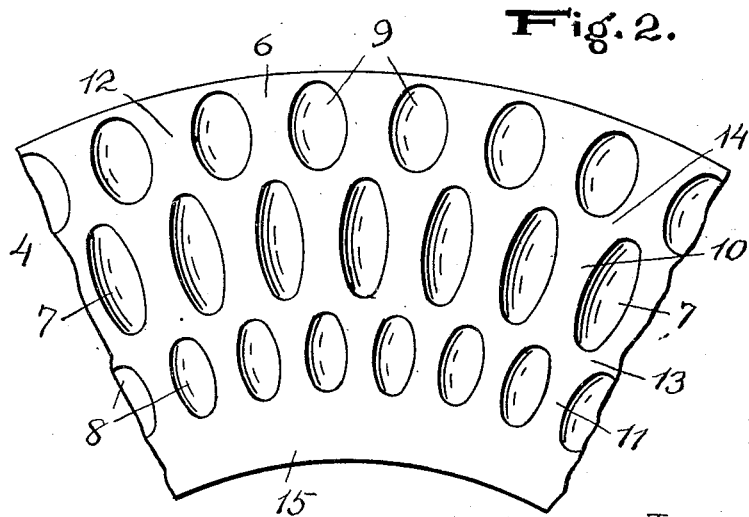

In the accompanying drawings illustrating the invention, Figure 1 is a transverse sectional view of the invention, and Fig. 2 is a fragmentary inside face view of one of the annular tire sections.

In these drawings the numeral 2 designates the outer casing of ordinary character, having the usual rim 3, and fitting within said casing is the filling or core constituting the invention. This core or filling is made in two annular sections, each a duplicate of the other and made in the same mold, each section being numbered 4, and having an outer annular convex face 5, of semicircular cross section, and an inner flat face or plane face 6, the plane faces of the two sections being in contact with each other.

Each section 4 is provided with a central series of recesses 7 opening into the plane face thereof and of oval cross section preferably; and with inner and outer series of recesses 8 and 9 also opening into the plane face of the section, alined with each other radially and staggered with relation to the members of the central series. The recesses 8 and 9 are also preferably oval in cross section.

Radial braces 10 of double tapered or I-form, are located between the central series of recesses and similarly formed radial braces 11 and 12 are located between the inner and outer series of recesses; and connecting the radial braces 10 strutwise with the braces 11 and 12, are angularly disposed braces 13 and 14, also of double tapered or I-form.

Preferably the central series of recesses are deeper than the inner and outer series of recesses, the former extending within a short distance of the convex face of the tire section and the latter being of about one half the depth of the center recesses. As shown the recesses of one of the sections 4 will be staggered with relation to the recesses of the other section 4, this being true also of the radial braces of the respective sections.

Each tire section is provided preferably with an annular extension 15 extending in and substantially filling the space between the flanges of the casing. Interposed between the core sections and the casing may be a lining 16 of suitable fabric or material to prevent the casing from becoming vulcanized to the tire sections in use, said lining having lapping inner marginal portions 17 located in the space between the flanges of the casing.

In the use of this tire, the air confined within the recesses of the tire sections will become compressed under the load and the compressed air will increase the elasticity of the tire. The radial braces of double tapered or I-form located between the series of recesses and connected by the similarly formed angularly disposed strut braces well resist collapse or give of the tire under the load and also owing to their special structure add to the elasticity of the tire.

I claim:—

1. An elastic non-inflatable tire for motor vehicles, including two sections each annular and provided with a convex outer face and a plane inner face, the plane faces of the two sections being in contact with each other, each section having a series of recesses of oval cross section, and radial braces formed of the rubber material of the section and separating the members of the series of recesses, said braces being of double tapered or I-form.

2. An elastic non-inflatable tire for motor vehicles, including two sections each annular and provided with a convex outer face and a plane inner face, the plane faces of the two sections being in contact with each other, each section having inner and outer series of recesses of oval cross section opening into the plane face thereof and extending toward the convex face, the series of recesses of each section being staggered, radial braces formed of the rubber material of the section and separating the members of each series of recesses, and braces also formed of the material of the section and angularly disposed with relation to both series of radial braces and connecting the same strutwise, said braces being all of double tapered or I-form.

In testimony whereof I affix my signature, in presence of two witnesses.

C. A. MORRISON.

Witnesses:
Geo. E. Caylor,
George M. Anderson.